(12) United States Patent
Cheng et al.

(10) Patent No.: US 10,985,470 B2
(45) Date of Patent: Apr. 20, 2021

(54) CURVED NEAR-FIELD-FOCUSED SLOT ARRAY ANTENNAS

(71) Applicant: University of Electronic Science and Technology of China, Chengdu (CN)

(72) Inventors: Yujian Cheng, Chengdu (CN); Yafei Wu, Chengdu (CN); Jinfan Zhang, Chengdu (CN); Fan Zhao, Chengdu (CN); Chunxu Bai, Chengdu (CN); Yong Fan, Chengdu (CN); Kaijun Song, Chengdu (CN); Bo Zhang, Chengdu (CN); Xianqi Lin, Chengdu (CN); Yonghong Zhang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 16/386,296

(22) Filed: Apr. 17, 2019

(65) Prior Publication Data

US 2019/0326679 A1 Oct. 24, 2019

(30) Foreign Application Priority Data

Apr. 23, 2018 (CN) .......................... 201810364915.9
Apr. 23, 2018 (CN) .......................... 201810364916.3

(51) Int. Cl.
*H01Q 13/22* (2006.01)
*H01Q 21/06* (2006.01)
(Continued)

(52) U.S. Cl.
CPC ............. *H01Q 13/22* (2013.01); *H01P 3/081* (2013.01); *H01P 3/121* (2013.01); *H01P 5/08* (2013.01);
(Continued)

(58) Field of Classification Search
CPC ...... H04B 5/00; H04B 5/0018; H04B 5/0025; H04B 5/0031; H04B 5/0043;
(Continued)

(56) References Cited

U.S. PATENT DOCUMENTS 8,665,142 B2 * 3/2014 Shijo .................... H01Q 21/064
342/175
8,838,175 B2 * 9/2014 Zhang ..................... H01P 3/121
455/559
(Continued)

*Primary Examiner* — Seokjin Kim
(74) *Attorney, Agent, or Firm* — Matthias Scholl P.C.; Matthias Scholl

(57) ABSTRACT

A slot array antenna including a smooth curved surface and planar feed structures which are respectively disposed at two ends of the smooth curved surface and are tangent to the smooth curved surface. The smooth curved surface includes at least two arcs mutually connected by smooth transition. The at least two arcs each includes an upper copper metal layer, a lower copper metal layer, and a dielectric substrate layer between the upper and lower copper metal layers. The upper copper metal layer includes radiating slots, and the adjacent radiating slots in a linear array have opposite offsets along the center line of the slot array antenna. The dielectric substrate layer includes metallic vias symmetrically arranged on both sides of the central line of the antenna to form a substrate integrated waveguide.

4 Claims, 23 Drawing Sheets

(51) Int. Cl.
   *H01Q 1/50*   (2006.01)
   *H01Q 1/38*   (2006.01)
   *H01P 3/12*   (2006.01)
   *H01P 5/08*   (2006.01)
   *H01P 3/08*   (2006.01)

(52) U.S. Cl.
   CPC ............... *H01Q 1/38* (2013.01); *H01Q 1/50* (2013.01); *H01Q 21/064* (2013.01)

(58) Field of Classification Search
   CPC .. H04B 5/0056; H04B 5/0075; H04B 5/0081; H04B 5/0087; H04B 5/04; H01Q 7/00; H01Q 13/22; H01Q 21/064; H01Q 1/50; H01Q 1/38; H01P 3/121; H01P 5/08; H01P 3/081
   See application file for complete search history.

(56)   References Cited

U.S. PATENT DOCUMENTS

| | | | |
|---|---|---|---|
| 10,020,591 B2* | 7/2018 | Uemichi | H01Q 13/22 |
| 2009/0066597 A1* | 3/2009 | Yang | H01Q 13/22 |
| | | | 343/771 |
| 2010/0321265 A1* | 12/2010 | Yamaguchi | H01Q 21/0043 |
| | | | 343/771 |
| 2014/0266946 A1* | 9/2014 | Bily | H01Q 13/22 |
| | | | 343/771 |
| 2015/0318620 A1* | 11/2015 | Black | H01Q 21/0087 |
| | | | 343/731 |

* cited by examiner

CURVED NEAR-FIELD-FOCUSED SLOT ARRAY ANTENNAS

CROSS-REFERENCE TO RELATED APPLICATIONS

Pursuant to 35 U.S.C. § 119 and the Paris Convention Treaty, this application claims foreign priority to Chinese Patent Application No. 201810364915.9 filed Apr. 23, 2018, and to Chinese Patent Application No. 201810364916.3 filed Apr. 23, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

This disclosure relates to the field of near-field-focused methods applied to antennas which are used for many near-field applications, such as microwave and millimeter-wave medical and industrial inspection systems, gateway access system, wireless power transmission systems, and RF identification systems.

In general, an antenna operates in the far-field region. However, in some cases, the energy radiated by the antenna is required to concentrate at a certain point in its near-field region, where a near-field-focused antenna is needed. The near-field-focused antenna can generate a focus with high energy in the near-field region, thereby improving the resolution and imaging capability of the detection system. Thus, the near-field-focused antenna has broad application prospects and research value in the fields of microwave wave imaging system, wireless energy transmission system, access control system, radio frequency identification system and microwave radio system. Different from the far-field array antenna, the near-field-focused array antenna has higher demands for the transmission structure in phase control capability. The near-field-focused array antenna needs to generate the quadratic phase distribution. As a result, it will increase the difficulty of the near-field-focused antenna design.

Leaky-wave antennas with frequency scanning ability are commonly used. The basic working principle of this type of antenna is to work in the traveling-wave mechanism with the matched load at the antenna terminal. As a result, the required phase distribution of the desired beam pattern can be achieved by adjusting the distribution of the antenna element. The first existing technique to achieve near-field-focused beam by using a leaky-wave antenna is to modify the width of the transmission line to change its phase constant. However, the phase controlled by the width of the feedline is sensitive to the frequency, which deteriorates the quality of the near-field-focused beam. For example, the focal height changes dramatically with the scanning of the focus. A stable focal height to steer the focus in a plane is significantly required in some application, e.g., non-contact detection and imaging systems. The second existing technique is to adjust the spacing of the radiating elements to achieve the desired phase. However, due to the required quadratic phase distribution of the near-field-focused antenna, the element distribution is sparse and nonuniform for a large aperture design. The sparse element distribution cannot meet the scanning requirements. In addition, for the above two techniques, both of them have a weakness that the height of the focus decreases dramatically during the scanning process, which cannot realize a wide scanning range.

For the standing-wave slot array antenna, a short-circuit is employed at the antenna terminal. At this time, standing-wave is formed inside the waveguide. The radiating elements of the array antenna are excited in the same phase and operate at a resonant state. The standing-wave slot array antenna is a classic antenna. It has a high radiation efficiency with a simple feeding network, which can greatly reduce the array size and cost. However, because of the standing-wave characteristics of the in-phase excitation of each element, the phase control ability is not available, and the quadratic phase distribution on the aperture of the near-field-focused antenna cannot be satisfied. Therefore, the traditional standing-wave slot array antenna cannot be used to generate the near-field-focused beam.

SUMMARY

The disclosure provides curved near-field-focused slot array antennas.

Disclosed is a curved near-field-focused leaky-wave slot array antenna. The slot array antenna comprises a smooth curved surface and planar feed structures which are respectively disposed at two ends of the smooth curved surface and are tangent to the smooth curved surface. The smooth curved surface comprises at least two arcs mutually connected by smooth transition: the at least two arcs each comprises an upper copper metal layer, a lower copper metal layer, and a dielectric substrate layer between the upper and lower copper metal layers; the upper copper metal layer comprises radiating slots, and adjacent radiating slots in a linear array have opposite offsets along the center line of the slot array antenna; and the dielectric substrate layer comprises metallic vias symmetrically arranged on both sides of the central line of the antenna to form a substrate integrated waveguide.

The arc distance between an i-th radiating slot and an (i+1)-th radiating slot can be represented by $\Delta L_i$, and the curve function of the projection of the surface between the two radiating slots on an xoz plane is represented by $z=f_i(x)$; $\Delta L_i$ and $z=f_i(x)$ should satisfy the equations:

$$\begin{cases} k(r_{i+1}-r_i)\beta\Delta L_i + \pi \\ r_i = \sqrt{(z_0 - f_i(x_i))^2 + x_i^2} \\ \Delta L_i = \int_{x_i}^{x_{i+1}} \sqrt{1 + f_i'(x)}\, dx \\ f_i(x_{i+1}) = f_{i+1}(x_{i+1}) \\ f_i'(x_{i+1}) = f_{i+1}'(x_{i+1}) \end{cases}$$

where $x_i$ and $r_i$ represent transverse coordinates of the i-th radiating slot and a distance between the i-th ($i \geq 1$) radiating slot and a near-field focal point, respectively; $z=f_i(x)$ is the curve function equation which represents a surface projection between the i-th radiating slot and the (i+1)-th slot in the xoz plane; $f_i(x)$ and $f_{i+1}(x)$ intersect at $x_{i+1}$ and derivatives of $f_i(x)$ and $f_{i+1}(x)$ are equal at $x_{i+1}$; $\Delta L_i$ is the arc distance between the two radiating slots, which is obtained by integrating a curve equation within a range between $x_i$ and $x_{i+1}$; $z_0$ represents a height of a near-field focus; $f_i(x_i)$ is an ordinate of the i-th radiating slot: and k and $\beta$ are propagation constants of electromagnetic waves in a free-space and the substrate integrated waveguide, respectively.

The slot array antenna can comprise 24 radiating slots, which can be the same in width and length.

The upper and lower copper metal layers and the dielectric substrate layer can be formed by a planar PCB processing technology, and then proactively conformal to a 3D-printed framework.

The planar feed structures can be a T-shaped structure in which a microstrip line transits to the substrate integrated waveguide.

Also provided is a near-field-focused standing-wave slot array antenna, being in the shape of a circular arc comprising an upper copper metal layer, a lower copper metal layer, and a dielectric substrate layer between the upper and lower copper metal layers; the upper metal copper layer is an inner layer relative to the center of the circular arc. The dielectric substrate layer comprises metallic vias; the metallic vias comprise two rows of lateral metallic vias symmetrically arranged on both sides of the center line of the circular arc and one column of metallic vias located at one end of the circular arc; the two rows of metallic vias are adapted to form a substrate integrated waveguide, and the one column of metallic vias are adapted to close one end of the two rows of metallic vias to form a short circuit: the other end of the two rows of metallic vias is provided with a planar feed structure; and the upper metal copper layer comprises a plurality of radiating slots staggered on both sides of the center line of the circular arc.

The plurality of radiating slots can have the same length, width, and offset distance from the center line of the circular arc; a distance between adjacent radiating slots is $\frac{1}{2}\lambda_g$; a distance between the short circuit and one radiating slot closest to the short circuit is $\frac{1}{4}\lambda_g$, where $\lambda_g$ is a waveguide wavelength of an electromagnetic wave propagating inside the substrate integrated waveguide.

The slot array antenna can comprise 16 radiating slots.

The central angle of the circular arc can be 90°.

One end of the dielectric substrate layer close to the planar feed structure can comprise two metalized matching vias which are adapted to adjust an impedance matching between the planar feed structure and the radiating slots.

The upper and lower copper metal layers and the dielectric substrate layer can be formed by a planar PCB processing technology, and then proactively conformal to a 3D-printed framework.

The planar feed structures can be a T-shaped structure in which a microstrip line transits to the substrate integrated waveguide.

Compared with the prior art, the disclosure has the following advantages:

The disclosure is based on curved substrate integrated waveguide, and the substrate integrated waveguide is designed into a certain curved shape to break the limitation of traditional planar design method in amplitude and phase control ability, thus enhancing the amplitude and phase control capability of the device. The spatial location of each antenna element is employed as a new parameter, working together with inherent phase adjusting ability, to obtain the desired phase excitation much more easily.

The disclosure provides a curved near-field-focused leaky-wave slot array antenna. The focus has a stable focal height over a wide steerable range. The slot array antenna realizes a large-scale scanning range of the focus through the designed curved shape. The designed proactive conformal leaky-wave slot array antenna has a more compact slot distribution, much wider scanning range, more stable focus height, and better peak power flatness compared with the planar case. Moreover, the slot array antenna also has a better peak power flatness within a lager scanning range.

The disclosure provides a curved near-field-focused standing-wave slot array antenna. The shape of an array antenna becomes a new parameter in the synthesis of the near-field-focused beam and is proactively curved to satisfy the design requirement. The slot array antenna can realize the near-field focusing with a standing-wave slot array. The limitation of the standing-wave array in phase excitation is solved, so that the standing-wave slot array antenna with high radiation efficiency advantage can be applied to the near-field focusing.

In Example 1, 1-1 is an upper copper metal layer, 1-2 is a dielectric substrate layer 1-3 is a lower metal copper layer 1-4 are radiating slots, 1-5 are metallic vias, 1-6 are through holes on the dielectric substrate layer, 1-71 and 1-72 are input and output ends of the T-shaped feed structure from the microstrip line to the substrate integrated waveguide, respectively, and 1-8 are threaded holes of a curved base.

Figure 15:
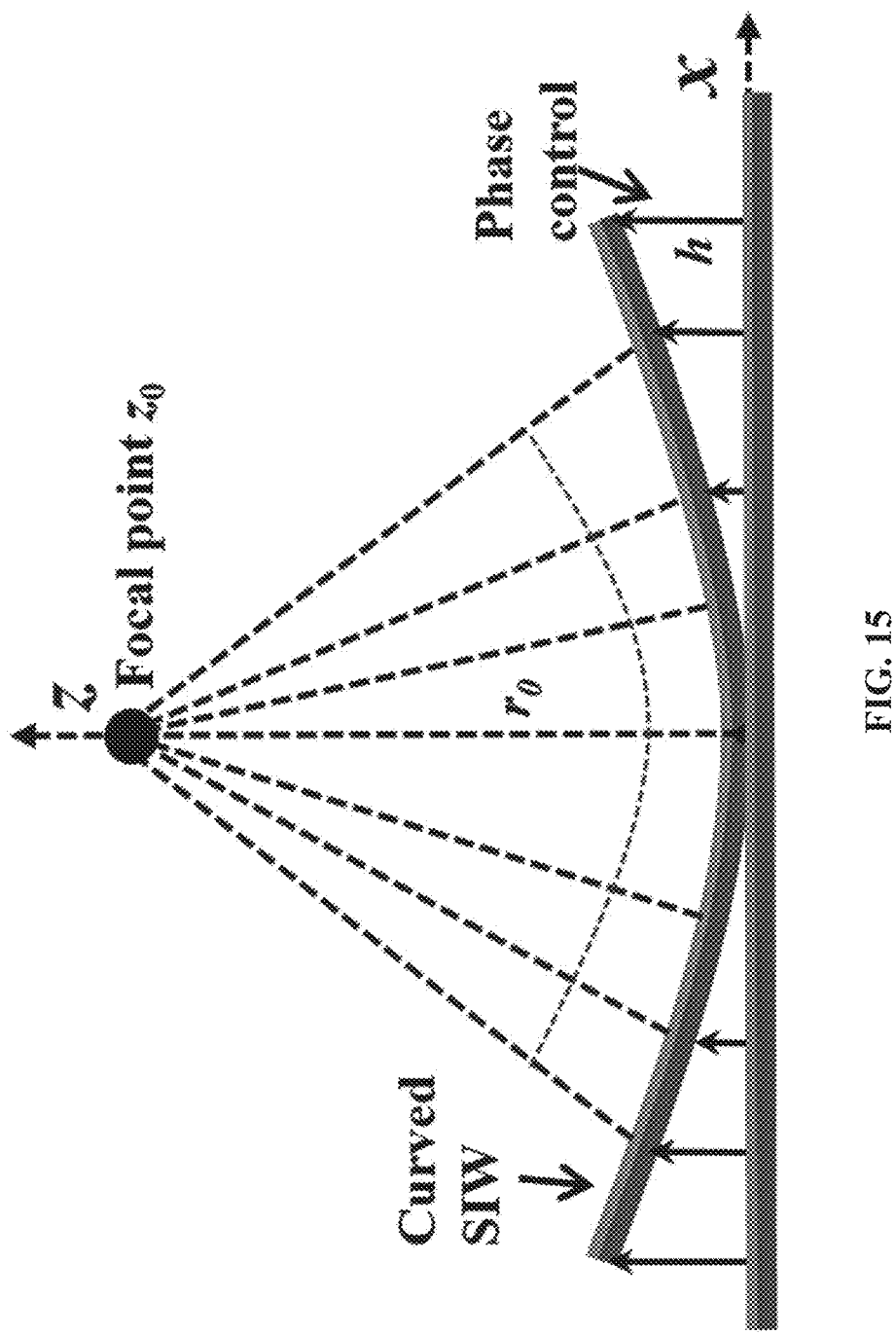

FIG. 15 shows the design principle of the antenna for near-field focusing beam-forming in Example 2.

Figure 16:
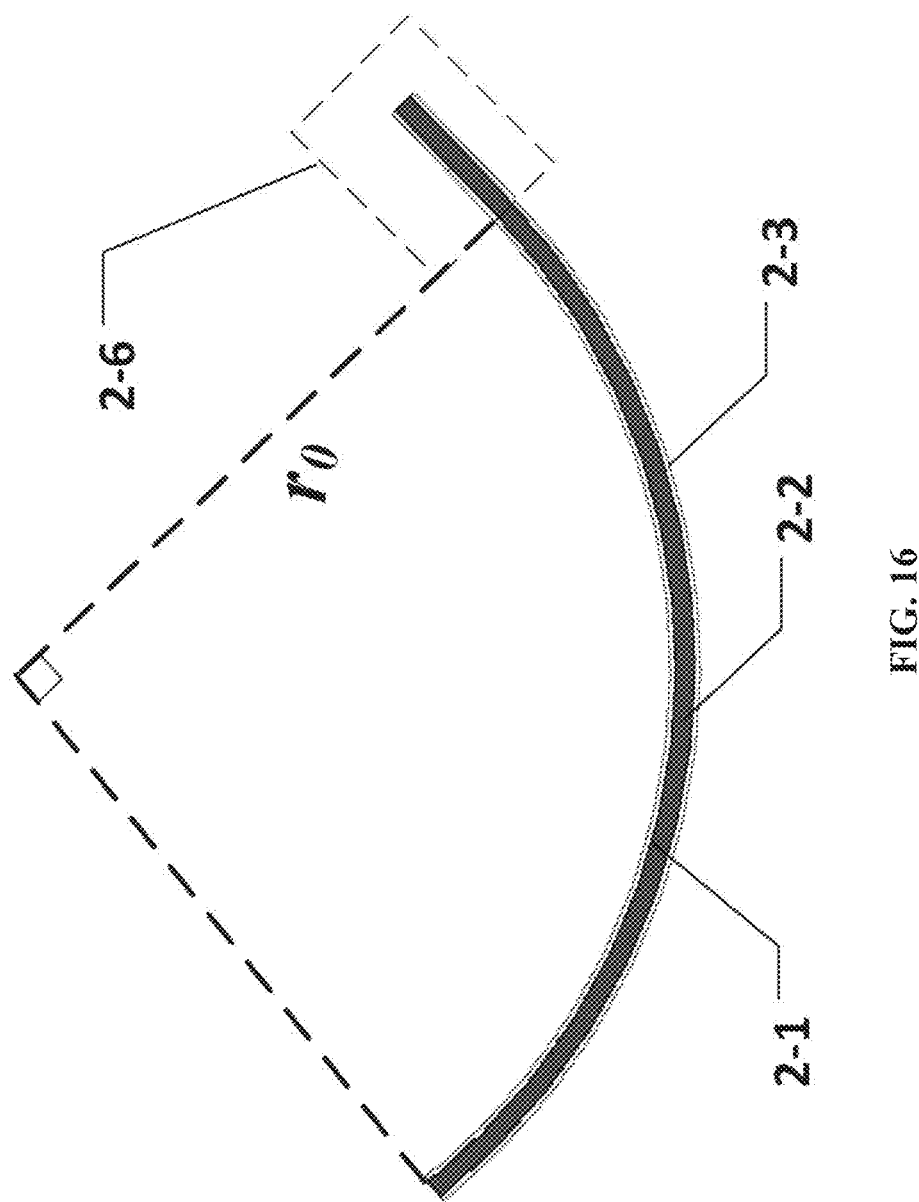

FIG. 16 shows the structure of the curved near-field-focused standing-wave slot array antenna in Example 2.

Figure 17:
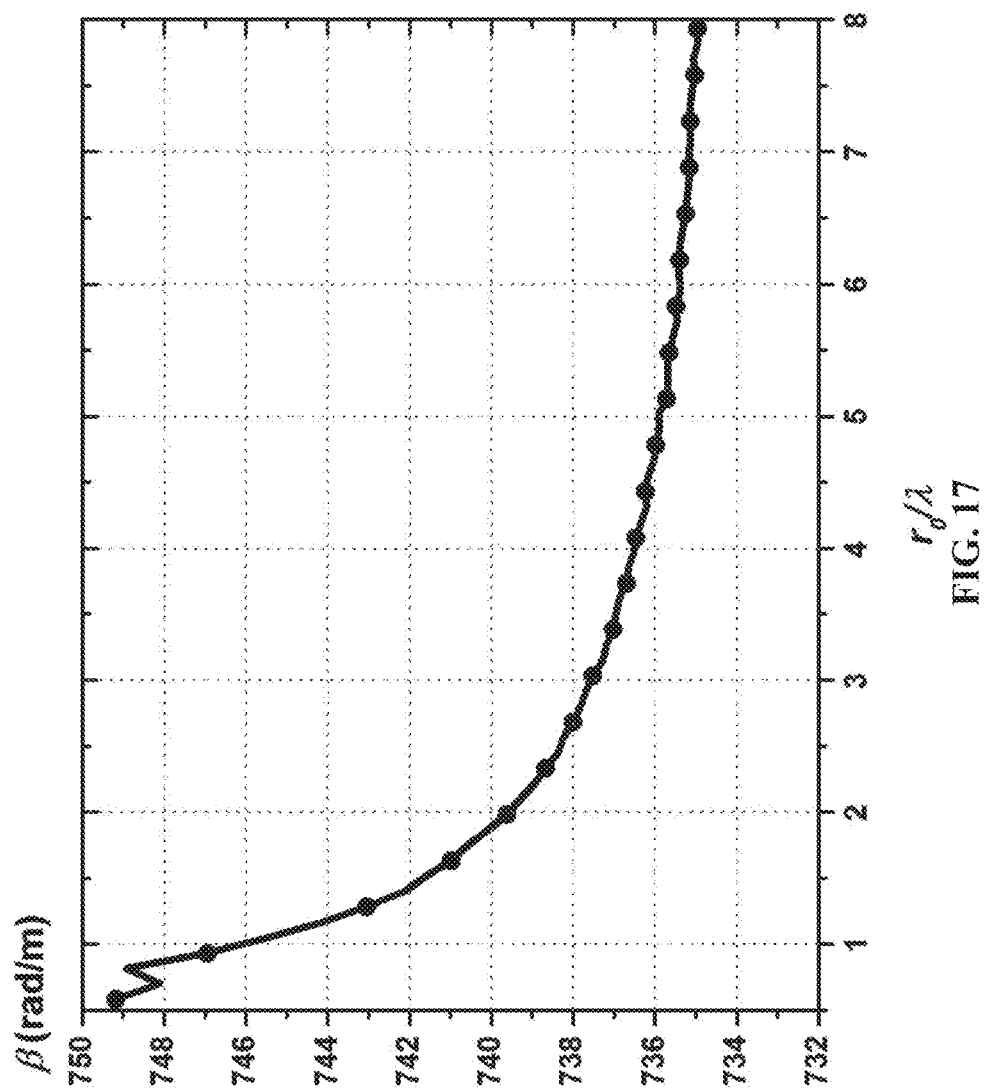

FIG. 17 shows the variation trend of β with the change of the curved radius $r_0$ in Example 2.

Figure 18:
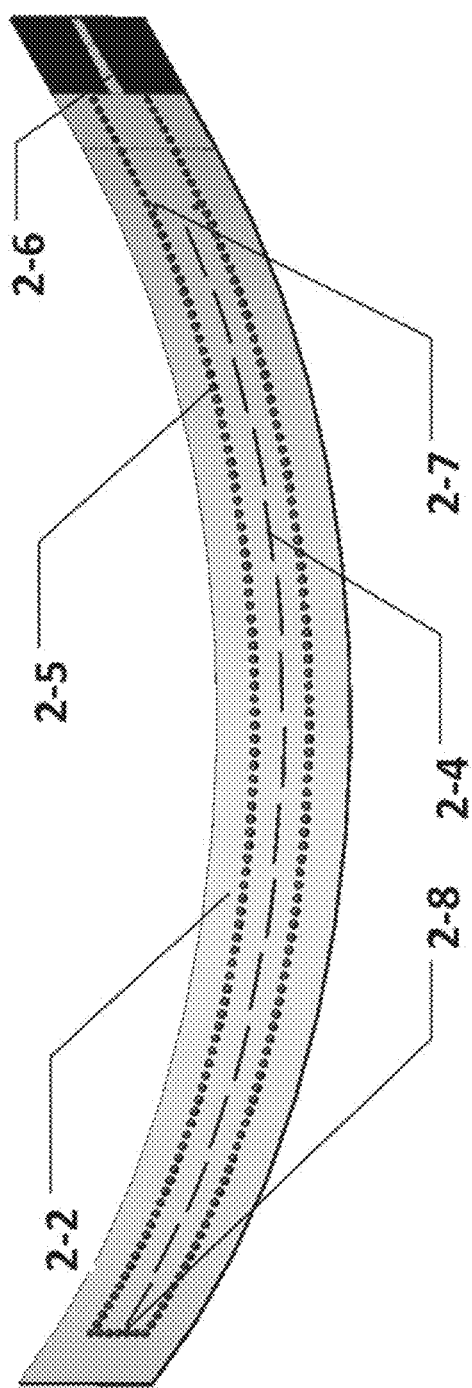

FIG. 18 shows the overall schematic of the standing-wave slot array antenna in Example 2.

Figure 19:
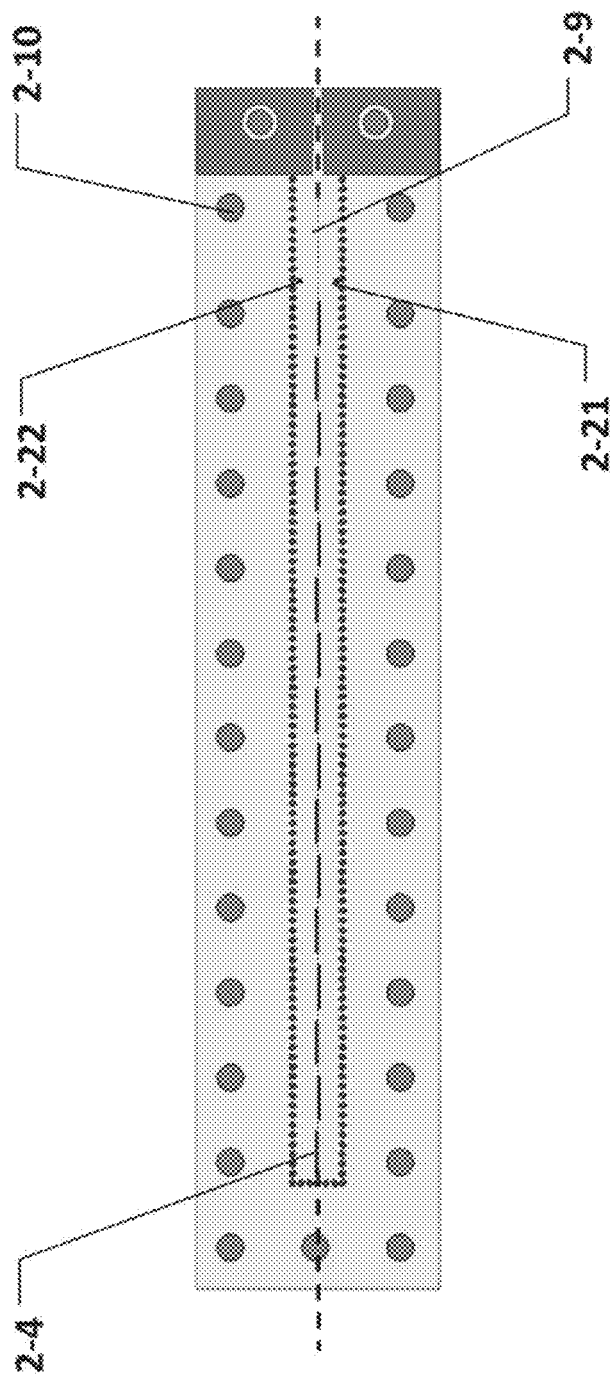

FIG. 19 shows the plane expansion diagram (plane processing diagram) of the standing-wave slot array antenna in Example 2.

Figure 20:
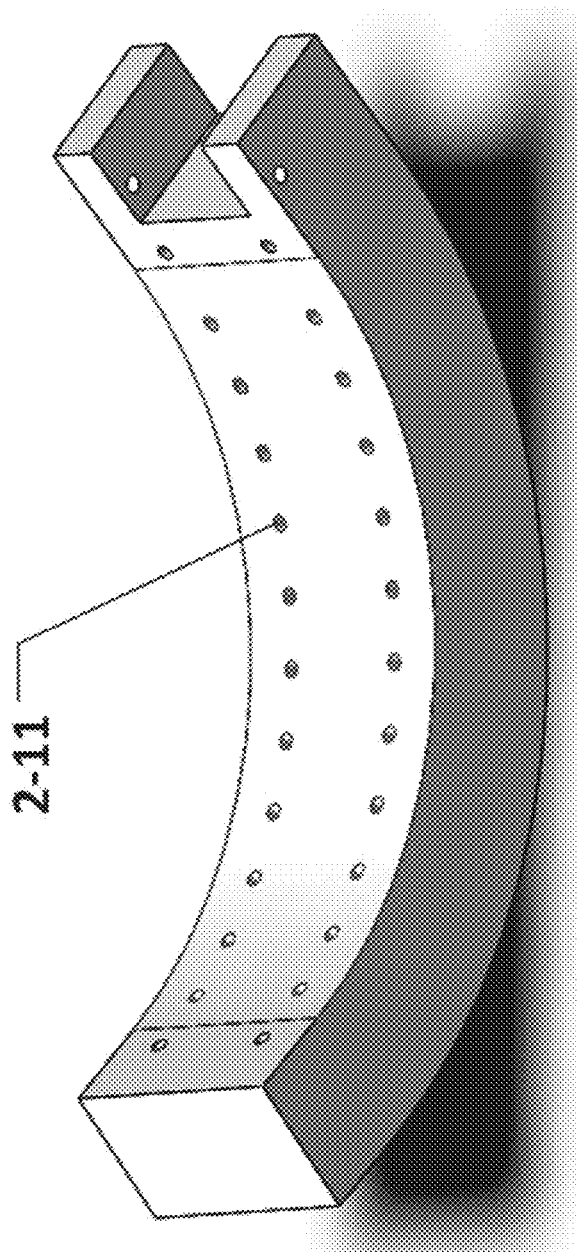

FIG. 20 shows the 3D processing assembly diagram of the standing-wave slot array antenna base in Example 2.

Figure 21:
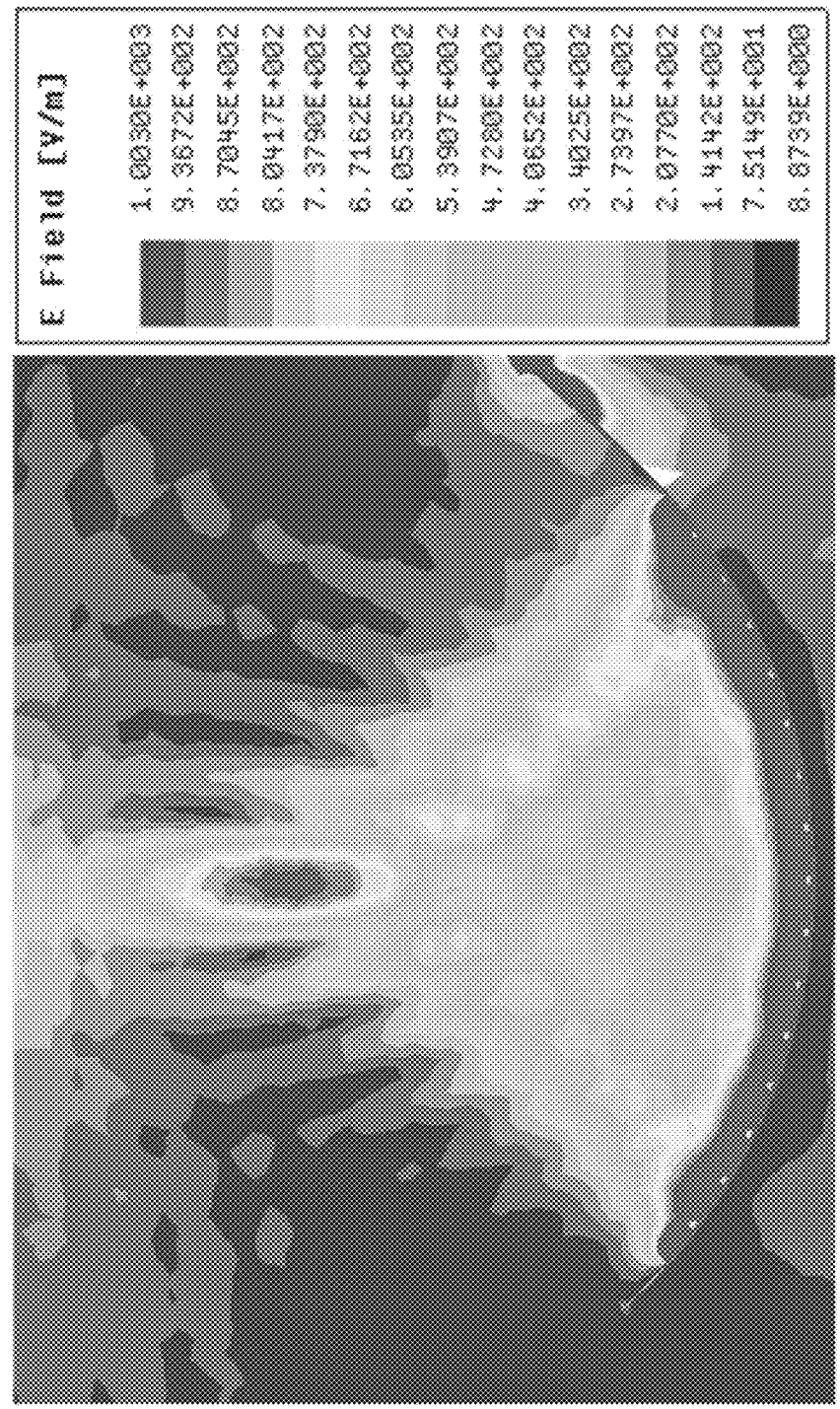

FIG. 21 shows simulated results of the near field focusing antenna in Example 2.

Figure 22:
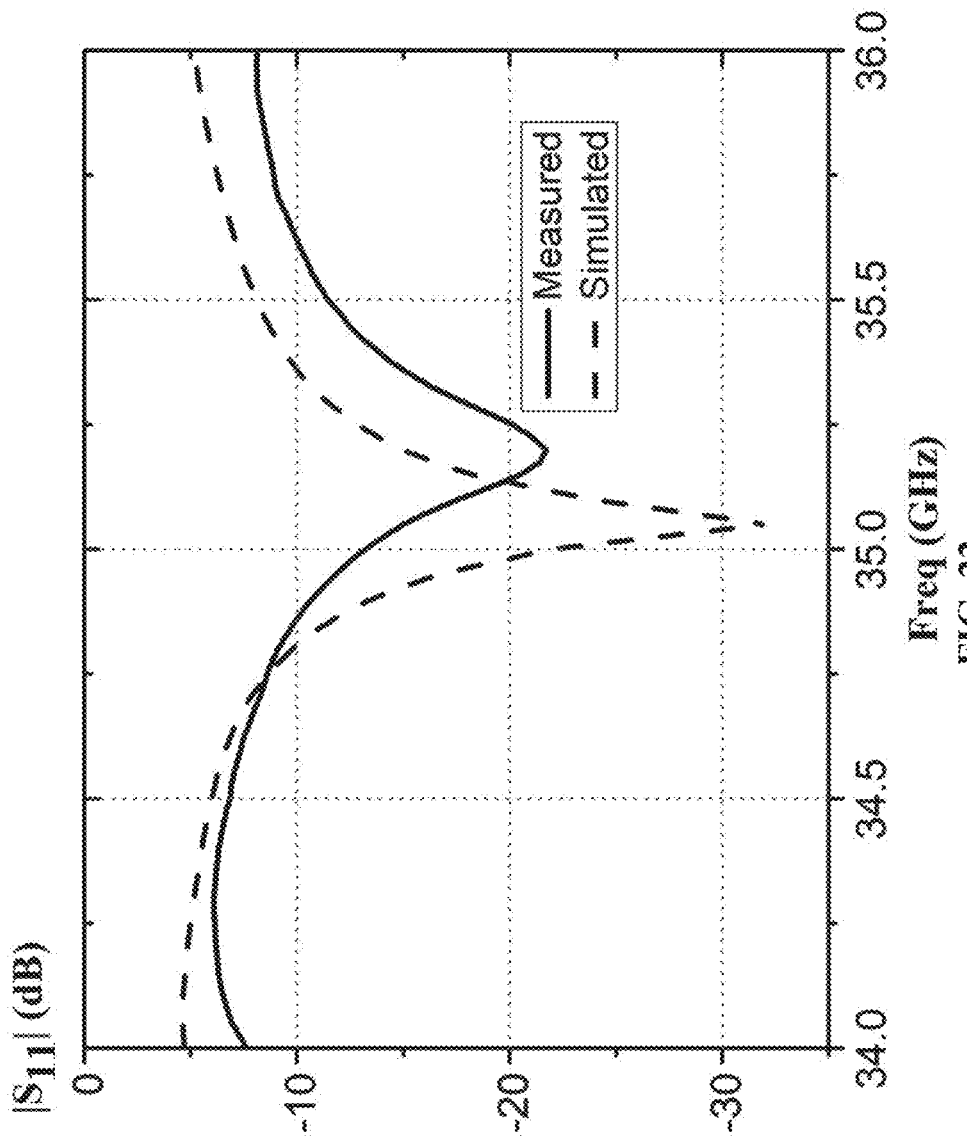

FIG. 22 shows the S-parameter measured and simulated results in Example 2.

Figure 23:
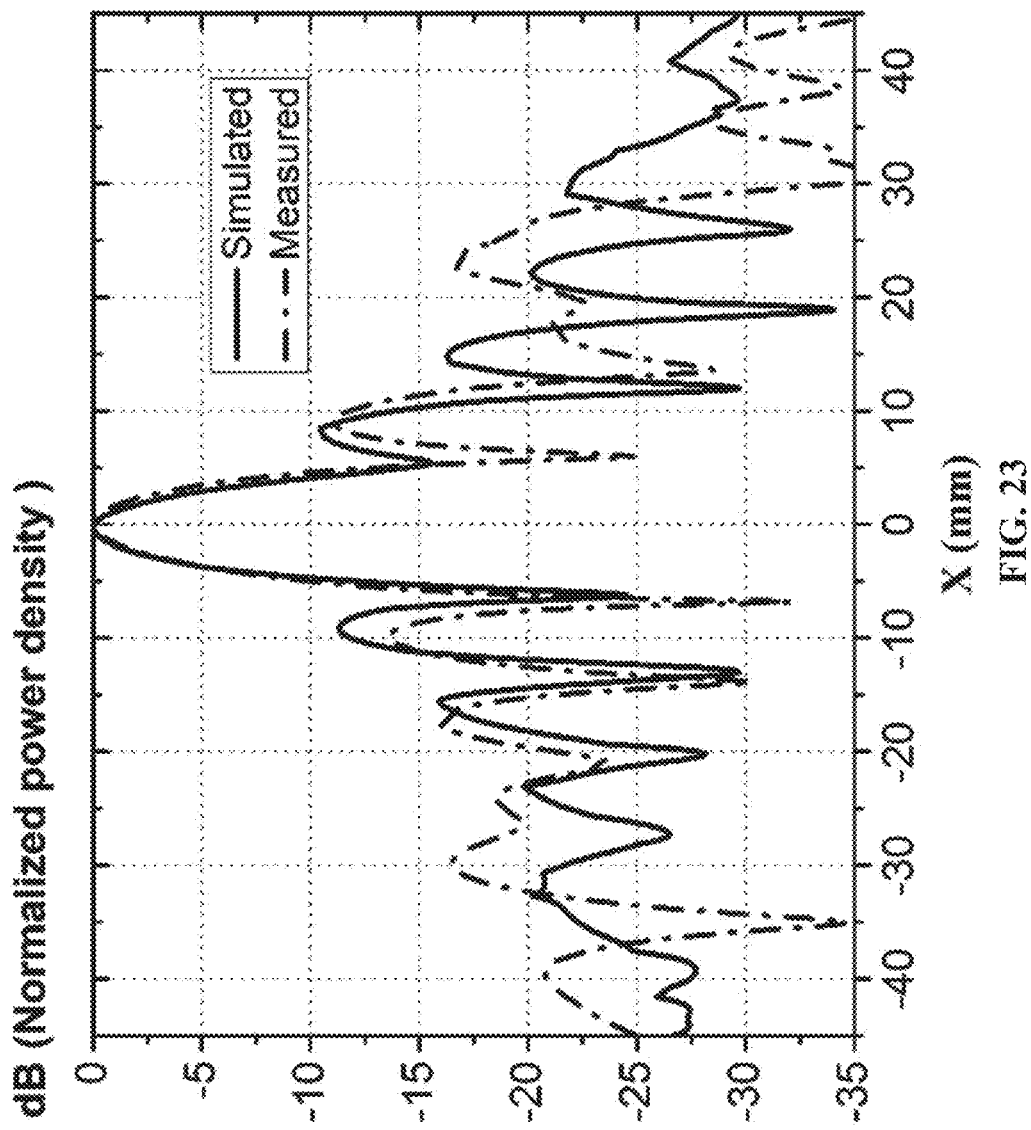

FIG. 23 shows the measured and simulated results of the E-plane normalized power pattern in Example 2.

In Example 2, 2-1 is an upper copper metal layer, 2-2 is a dielectric substrate layer, 2-3 is a lower copper metal layer, 2-4 is radiating slots, and 2-5 is lateral metallic vias. 2-6 is a planar feed structure, 2-7 is metalized matching vias, 2-8 is a column of metallic vias, 2-9 is a center line of the antenna, 2-10 is dielectric substrate through holes, and 2-11 is mounting screw holes, 2-21 is a first matching column, and 2-22 is a second matching column.

DETAILED DESCRIPTION

The embodiments of the disclosure will be described below with reference to specific examples.

Example 1

Figure 1:
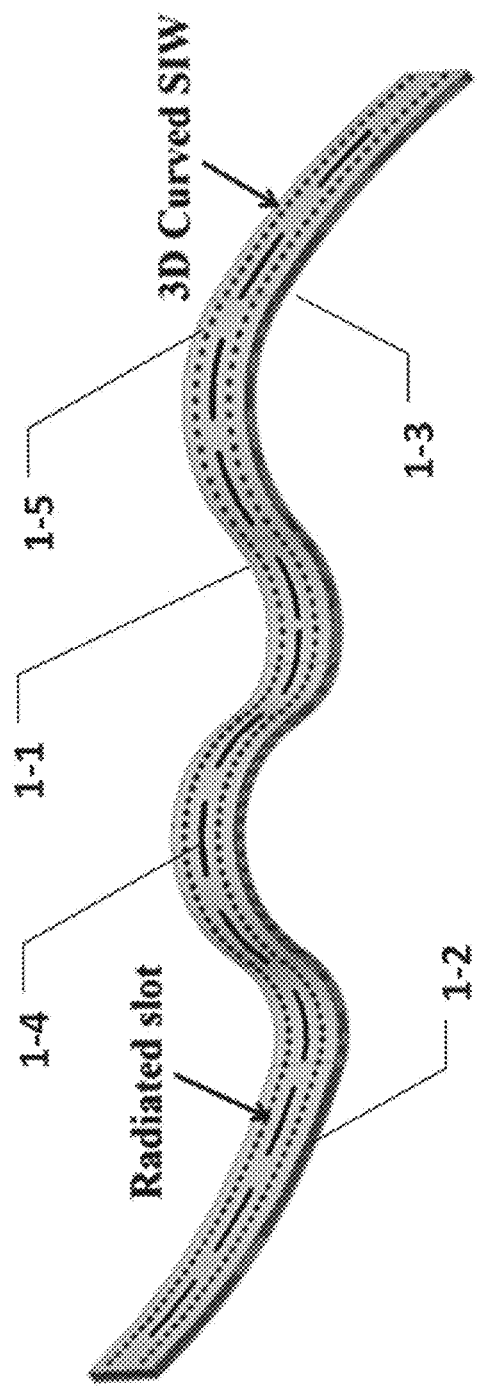
FIG. 1 shows the configuration of the proposed curved slot array antenna.

A curved near-field-focused leaky-wave slot array antenna is presented as shown in FIG. 1. The whole shape of the antenna is a smooth curved surface, which comprises at least two arcs connected by the smooth transition. The ends of the two antennas are planar feed structures which are tangent to the smooth curved surface. The antenna comprises an upper metalized copper layer 1-1, a lower metalized copper layer 1-3, and a dielectric substrate layer 1-2 between the two metalized copper layers. The upper metalized copper layer comprises radiating slots 1-4, where the adjacent radiating slots in a linear array have opposite offsets along the center line. Metallic vias are arranged in the dielectric substrate layer and symmetrically arranged on both sides of the central line of the antenna to form a substrate integrated waveguide.

Figure 2:
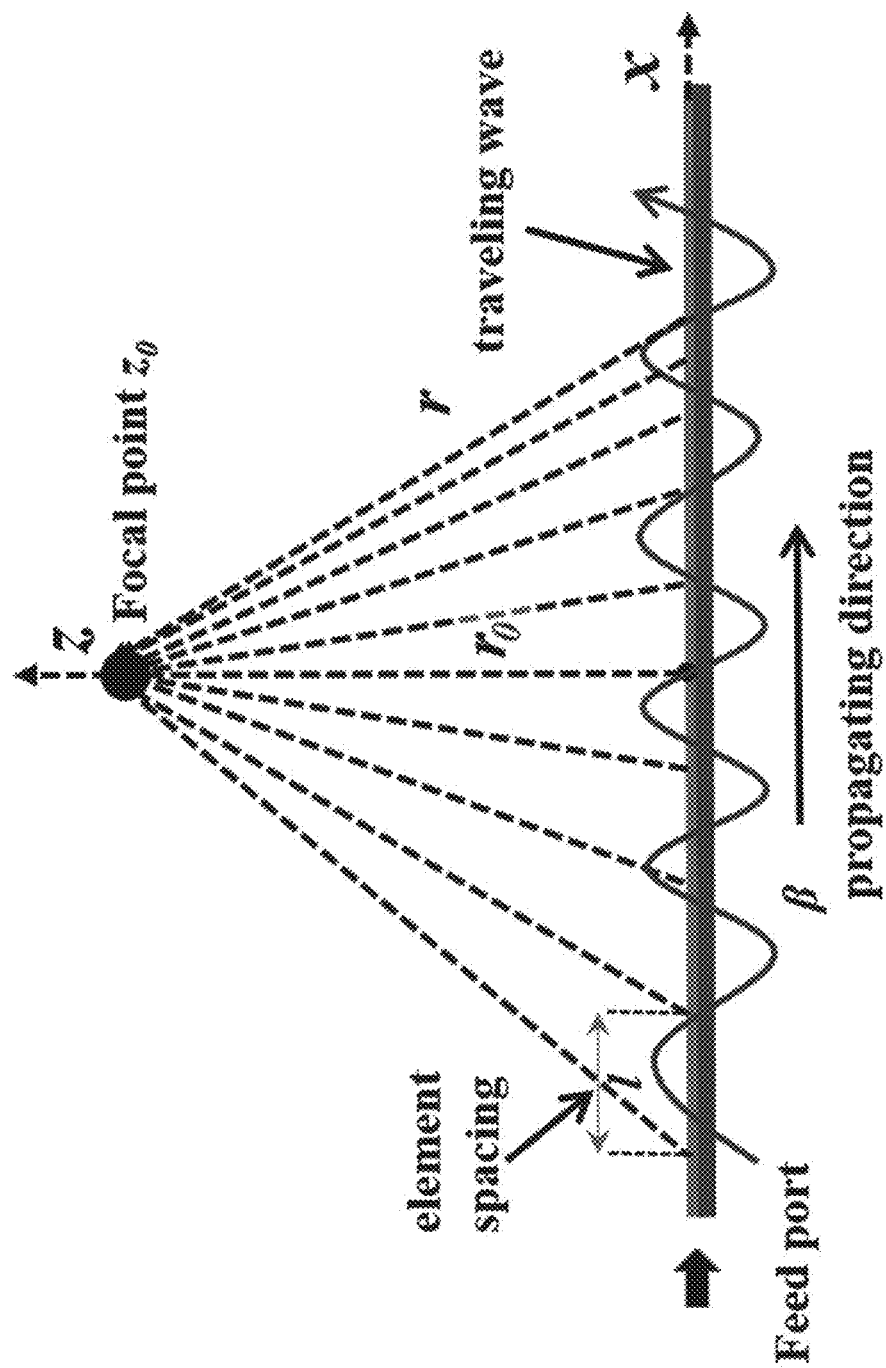
FIG. 2 shows the design principle of the planar leaky-wave slot array antenna for near-field-focused beam-forming in Example 1.

FIG. 2 shows the principle of a planar antenna for near-field-focused beam-forming. The quadratic phase distribution along the array aperture is as shown in the equation (1-1), and $z_0$ is the height of the near-field focus. For the planar leaky-wave antenna, the adjacent radiating slot spacing is found to increase from the right to the left, which makes the slot distribution unbalanced. The left side spacing mostly exceeds one wavelength spacing, which cannot meet the scanning requirement. The sparse element distribution will produce near-field spurious radiations and grating lobes.

$$r = \sqrt{x^2 + z_0^2} \Rightarrow \frac{r^2}{z_0^2} - \frac{x^2}{z_0^2} = 1 \qquad \text{Equation (1-1)}$$

Figure 3:
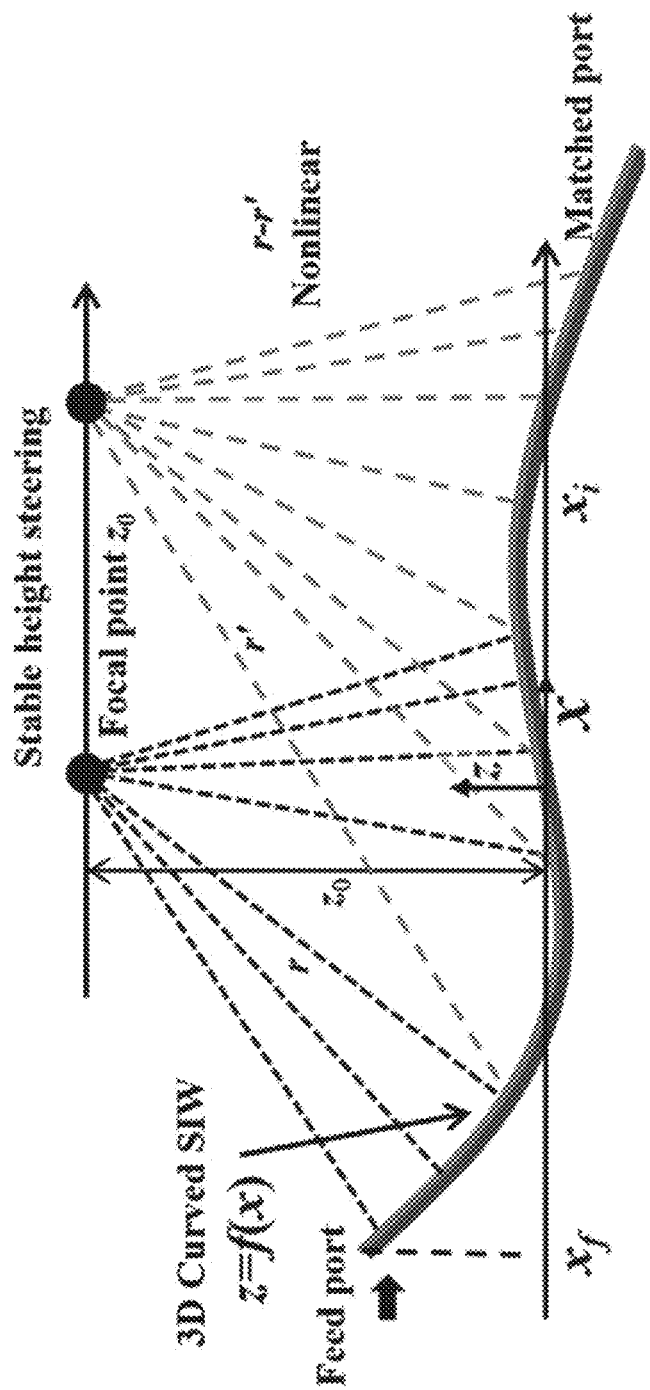
FIG. 3 shows the design principle of the curved substrate integrated waveguide near-field-focused leaky-wave slot array antenna in Example 1.

The proposed leaky-wave slot array antenna can realize a wide steerable range which traditional planar leaky-wave antenna cannot achieve. The spatial placement of the slot array antenna can be sufficiently used to synthesize the desired near-field-focused beam. The design principle of curved near-field-focused antenna is shown in FIG. 3. The longitudinal height of the antenna is employed to compensate the aperture phase. As a result, the slot position distribution can be adjusted to avoid excessive slot spacing. By reasonably designing the curved shape of the slot array antenna, the problem of the planar near-field case in large element spacing can be solved. In addition, the curved shape can be designed to keep the focus height unchanged with the move of the focus.

Figure 4:
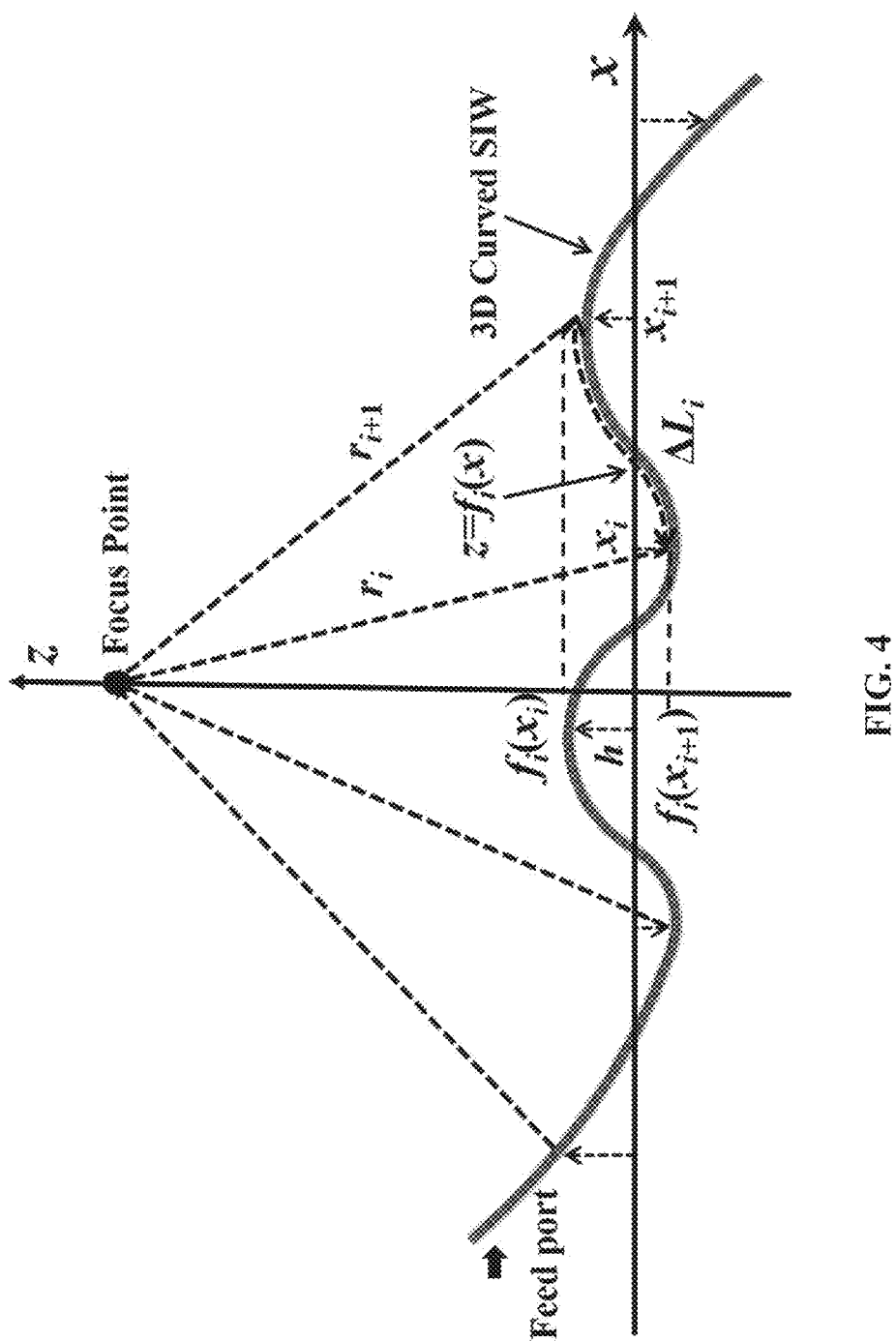
FIG. 4 shows the geometrical relationship of the curved slot array antenna in a Cartesian coordinate system in Example 1.

As shown in FIG. 4, the arc distance between the i-th radiating slot and the (i+1)-th radiating slot is represented by $\Delta L_i$, which is obtained by integrating the curve equation within the range between $x_i$ and $x_{i+1}$. The curve function of the curved surface projection between the two radiating slots on the xoz plane is represented by $z=f_i(x)$, that is the equation (1-2). $x_i$ and $r_i$ represent the transverse coordinates of the i-th radiating slot and the distance between the i-th (i≥1) radiating slot and the near-field focus, respectively. $z=f_i(x)$ is the curve function which represents the surface projection between the i-th radiating slot and the (i+1)-th slot in the xoz plane. Furthermore, $f_i(x)$ and $f_{i+1}(x)$ intersect at $x_{i+1}$ and the derivatives of $f_i(x)$ and $f_{i+1}(x)$ are equal at $x_{i+1}$. $z_0$ represents the height of the near-field focus. $f_i(x_i)$ is the ordinate of the i-th radiating slot. k and β are the phase constants of electromagnetic waves in the free space and substrate integrated waveguide, respectively.

According to the phase distribution requirement of the near-field-focused antenna, the spatial position of each adjacent slot should satisfy the equation (1-3). According to the geometric relationship, $r_i$ and $x_i$ should satisfy the equation (1-4). As shown in the equation (1-5), $\Delta L_i$ is the integral of the function $f_i(x)$ from $x_i$ to $x_{i+1}$ along the curve. As shown in the equation (1-6) and equation (1-7), $f_i(x)$ and $f_{i+1}(x)$ intersect at $x_{i+1}$ and the derivatives of $f_i(x)$ and $f_{i+1}(x)$ are equal at $x_{i+1}$. By iteratively calculating and synthesizing the equations (1-3)-(1-7), the curved shape of the whole antenna and the distribution position of the radiating slot can be obtained. The comprehensive restrictions are as follows: ensure that the flexible metal is within the bendable range and that the slot spacing is not excessive.

$$z = f_i(x) \qquad \text{Equation (1-2)}$$

$$k(r_{i+1} - r_i) = \beta \Delta L_i + \pi \qquad \text{Equation (1-3)}$$

$$r_i = \sqrt{(z_0 - f_i(x_i))^2 + x_i^2} \qquad \text{Equation (1-4)}$$

$$\Delta L_i = \int_{x_i}^{x_{i+1}} \sqrt{1 + f'_i(x)^2}\, dx \qquad \text{Equation (1-5)}$$

$$f_i(x_{i+1}) = f_{i+1}(x_{i+1}) \qquad \text{Equation (1-6)}$$

$$f'_i(x_{i+1}) = f'_{i+1}(x_{i+1}) \qquad \text{Equation (1-7)}$$

Figure 5:
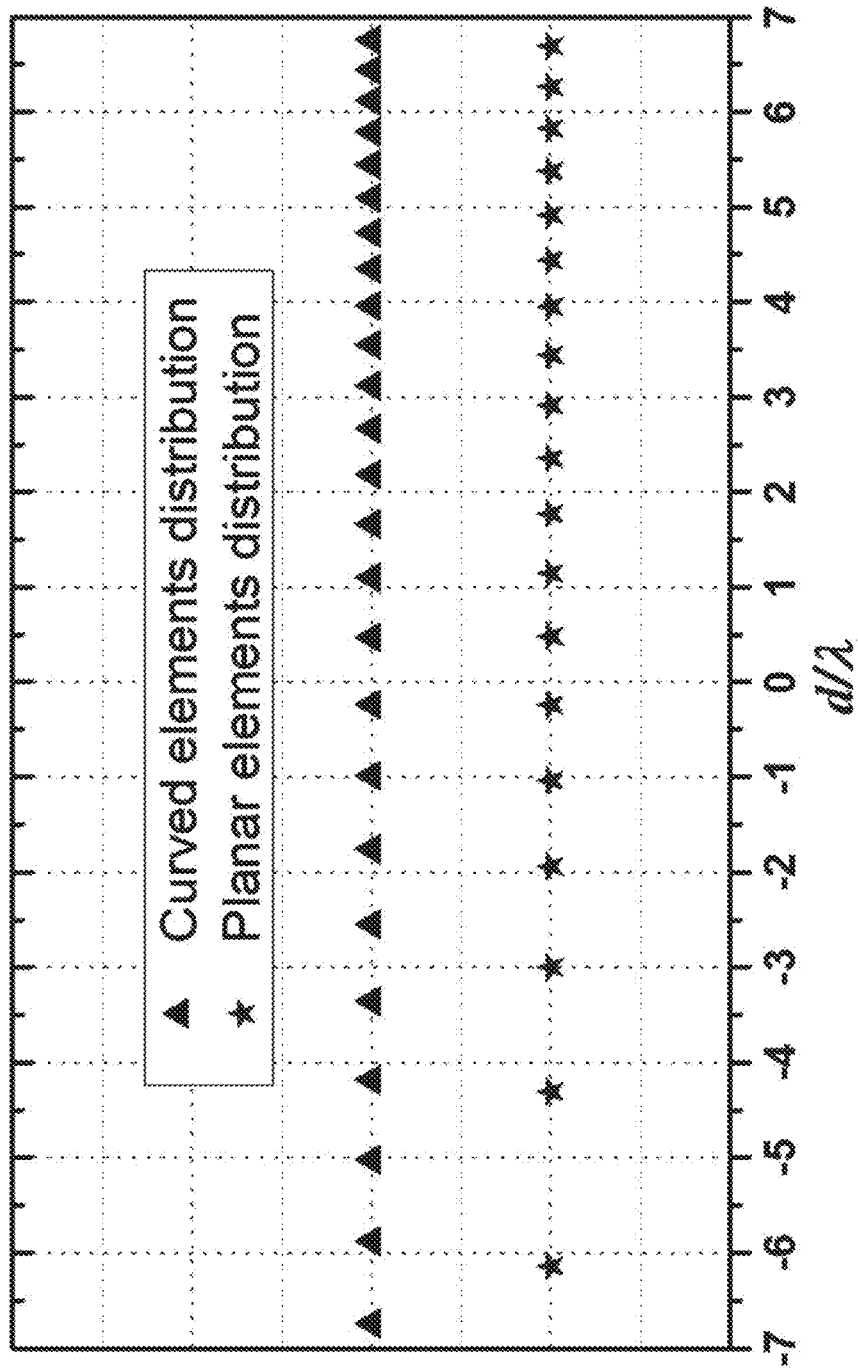
FIG. 5 shows the comparison of the slot positions of the curved case and the planar case in Example 1.
Figure 6:
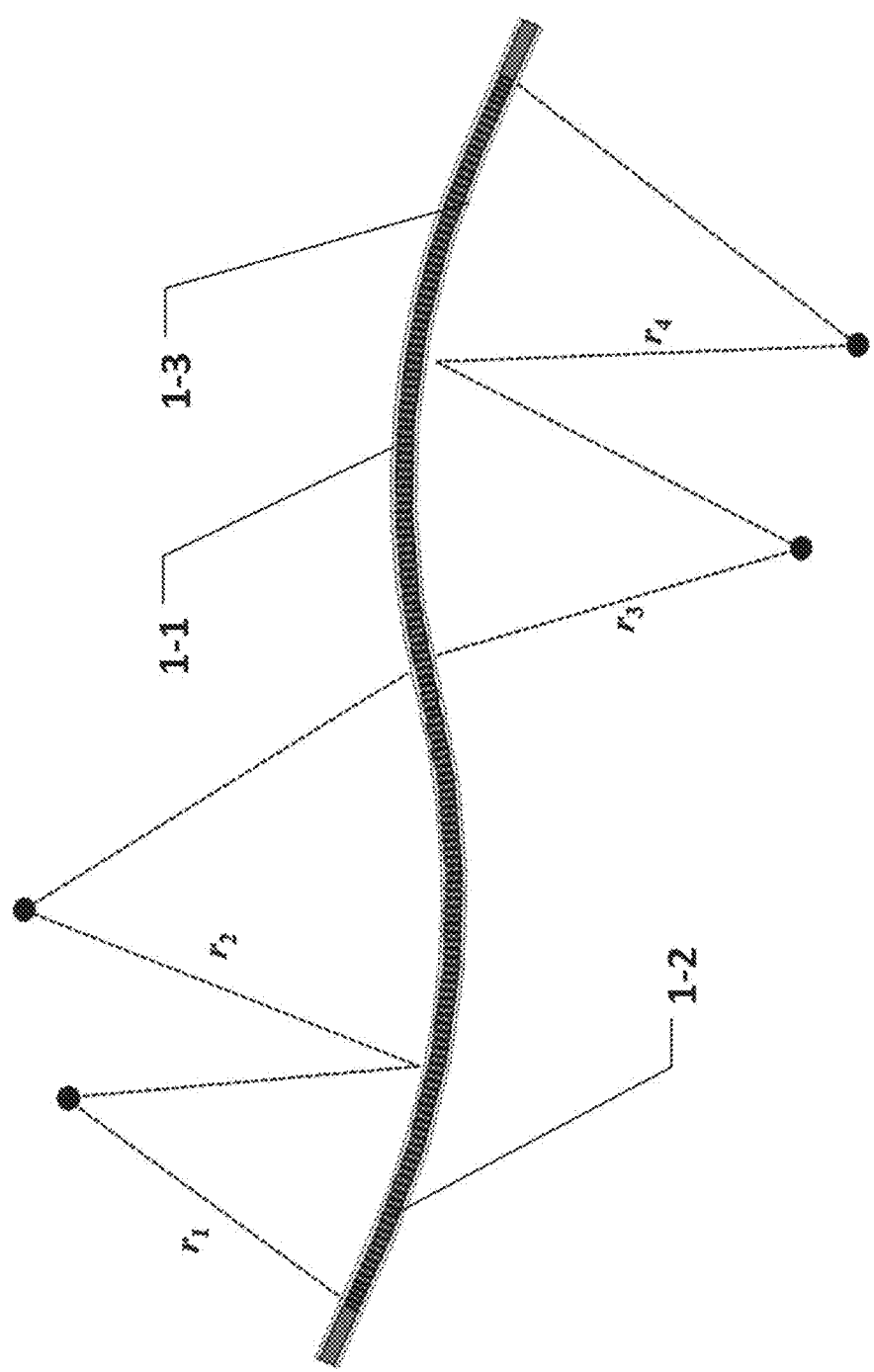
FIG. 6 shows the side view of the leaky-wave slot array antenna in Example 1.
Figure 7:
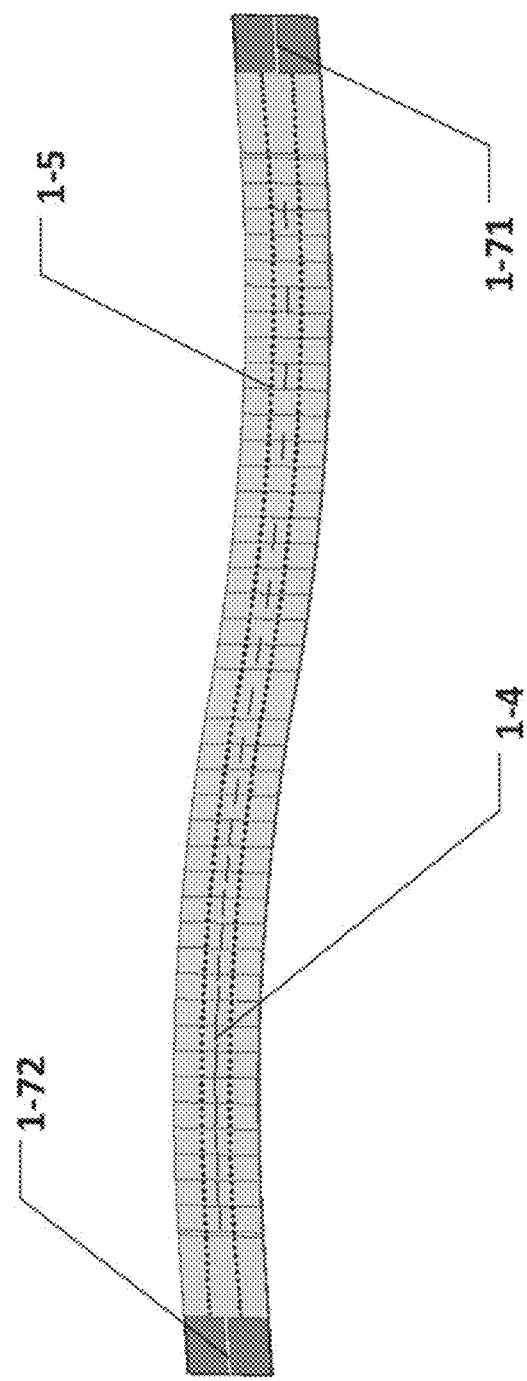
FIG. 7 shows the overall schematic of the leaky-wave slot array antenna in Example 1.
Figure 8:
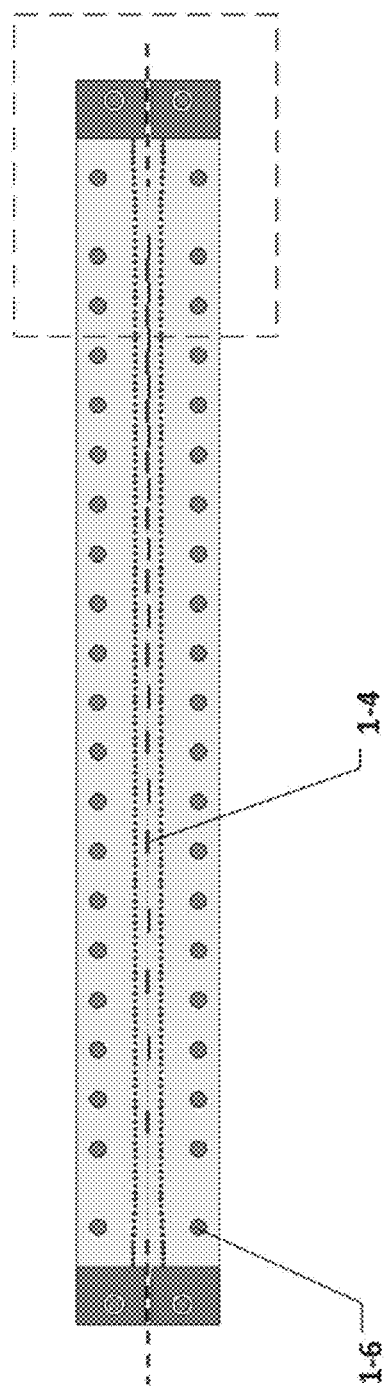
FIG. 8 shows the plane expansion diagram (plane processing diagram) of the leaky-wave slot array antenna in Example 1.

The distribution of the radiating slots is shown in FIG. 5. The side view of the leaky-wave slot array antenna is shown in FIG. 6, which comprises a four-segment arc and a flat structure at both ends, including two convex arcs with a radius of $r_1$ and $r_2$. and two concave arcs with a radius of $r_3$ and $r_4$. The ends of the two antennas are planar feed structures which are tangent to the smooth curved surface. The radius $r_1$ of the first arc is 150 mm, the radius $r_2$ of the second arc is 180 mm, the radius $r_3$ of the third arc is 280 mm, and the radius $r_4$ of the fourth arc is 300 mm. The first and second arc centers are on the upper side of the antenna, and the third and fourth arc centers are on the lower side of the antenna. The four end arcs have the same tangent plane at the joint place to ensure the smoothness of the entire antenna surface. The overall structures are as shown in FIGS. 6, 7, and 8. The lower copper metal layer 1-3, the dielectric substrate layer 1-2, and the upper metal copper layer 1-1 are stacked in this order from bottom to top. The bottom copper is coated. The upper metal copper layer 1-1 comprises radiating slots 1-4 extending vertically through the metal copper-clad layer, and the radiating slots 1-4 are staggered on the left and right sides of the antenna center line. There are 24 radiating slots 1-4, which have the same length and width, and the distances from the center line determine the radiating ability. The positions of the slot satisfy the distribution in the curved substrate integrated waveguide of FIG. 4. Metallic vias 1-5 are disposed on the dielectric substrate layer 1-2, and the metallic vias are symmetrically arranged on both sides of the center line to form the substrate integrated waveguide. The planar structures are the input and output 1-71, 1-72 of the T-feed structure, in which the microstrip line transits to the substrate integrated waveguide.

Figure 9:
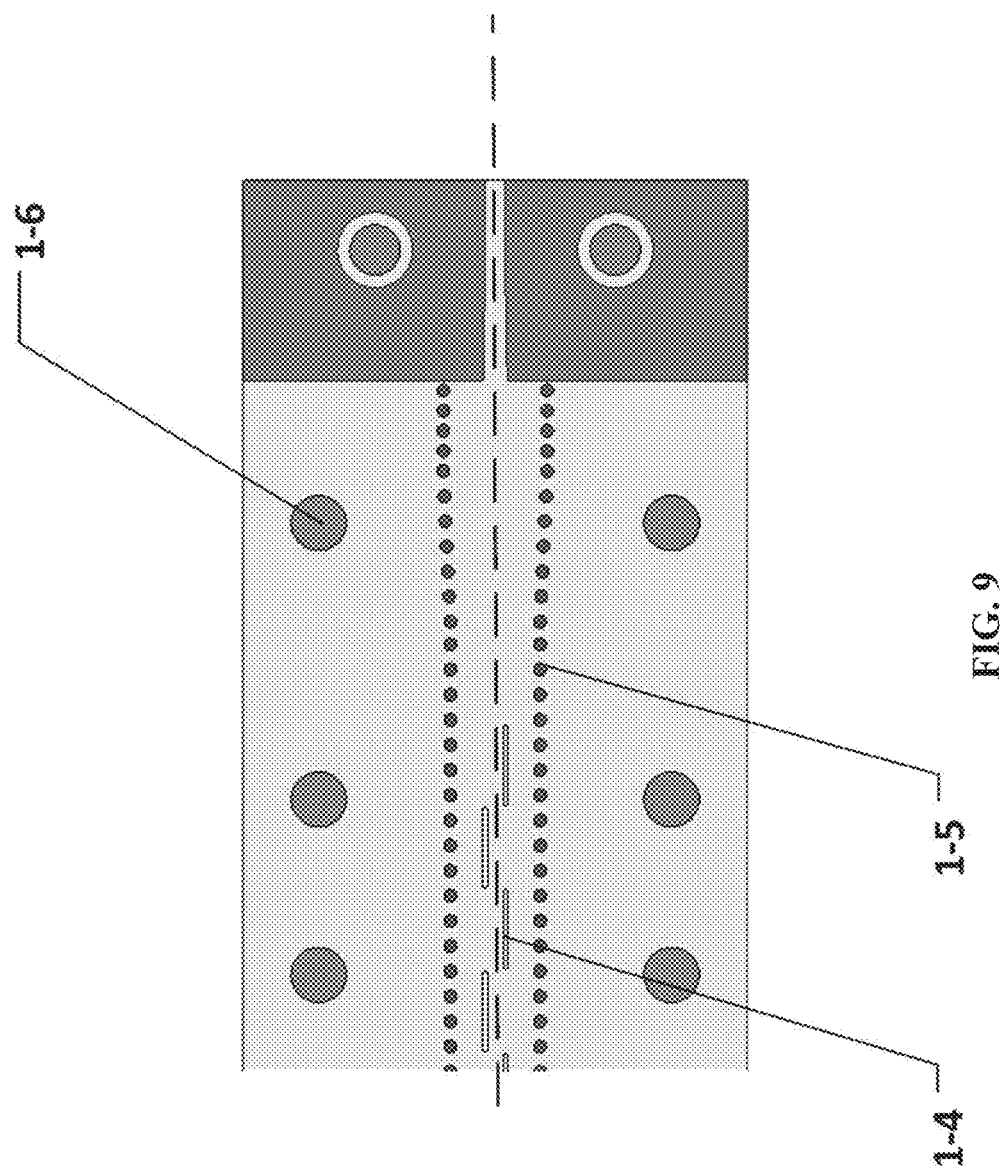
FIG. 9 shows the magnified schematic diagram of plane processing details in the leaky-wave slot array antenna in Example 1.
Figure 10:
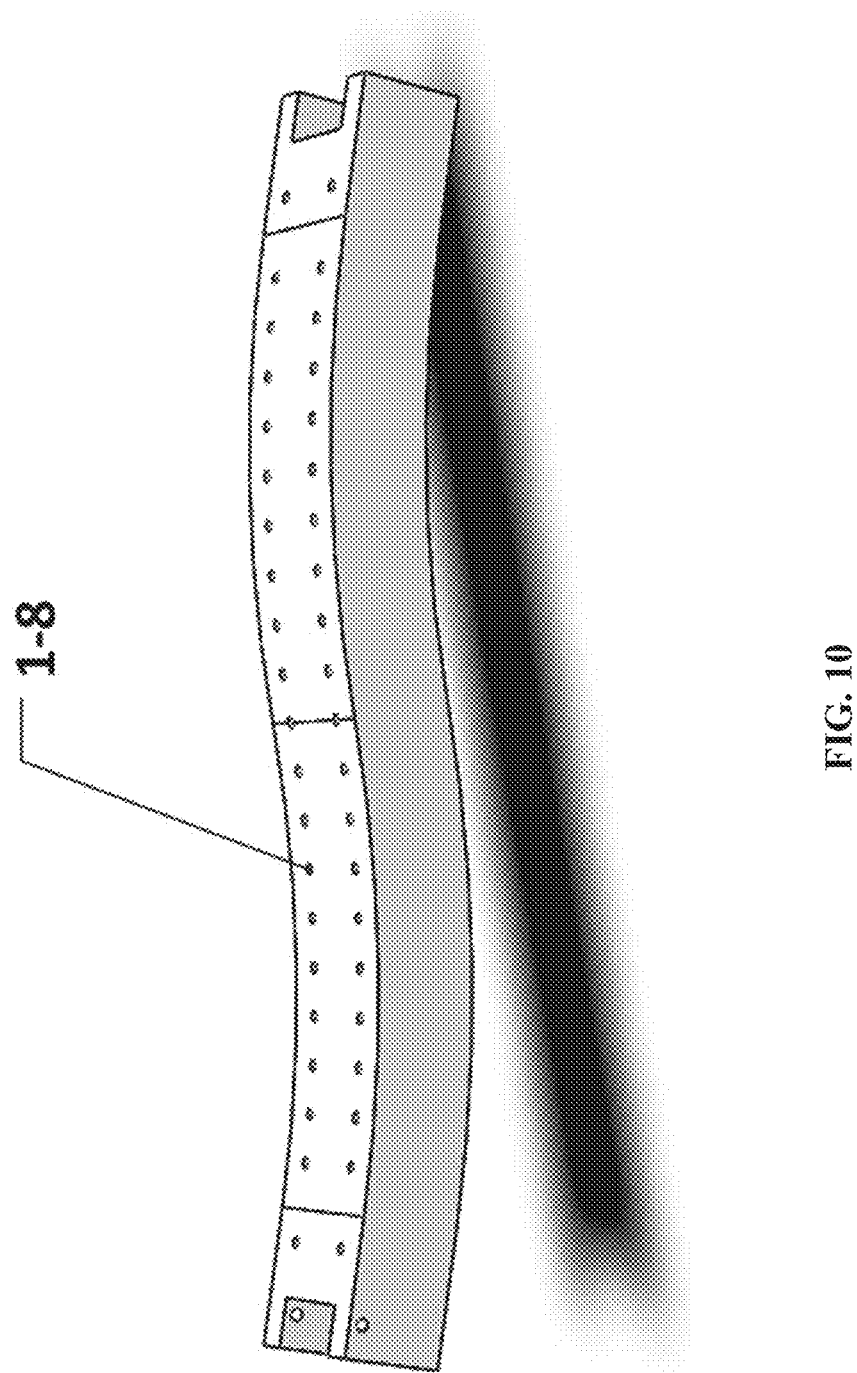
FIG. 10 shows the 3D processing assembly diagram of the leaky-wave slot array antenna in Example 1.

To fabricate the curved near-field-focused leaky-wave slot array antenna, the curved antenna model is transformed into a planar structure. It can be fabricated by planar PCB process. Then, the curved framework is printed by 3D printing technology. A curved near-field-focused antenna can be realized by closely fitting the planar processing antenna onto the curved framework. FIGS. 8 and 9 are schematic diagrams showing the planar processing of designed near-field-focused leaky-wave slot array antenna. FIG. 9 is an enlarged view of the block in FIG. 8. Two rows of through holes 1-6 are disposed on the dielectric substrate layer for fixing the antenna to the framework. The through holes 1-6 should be aligned with the positions of the threaded holes 1-8 of a curved base in FIG. 10 and then both of them are connected tightly by the screws.

Figure 11:
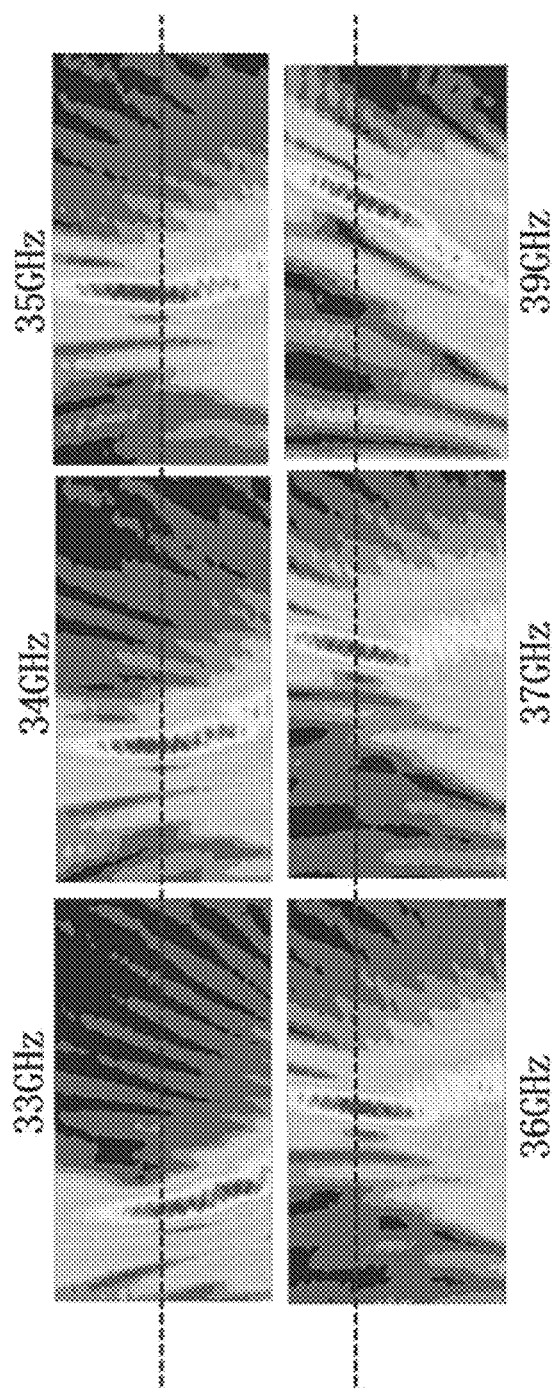
FIG. 11 shows simulated results of scanning characteristics of the near-field-focused antenna in Example 1.
Figure 12:
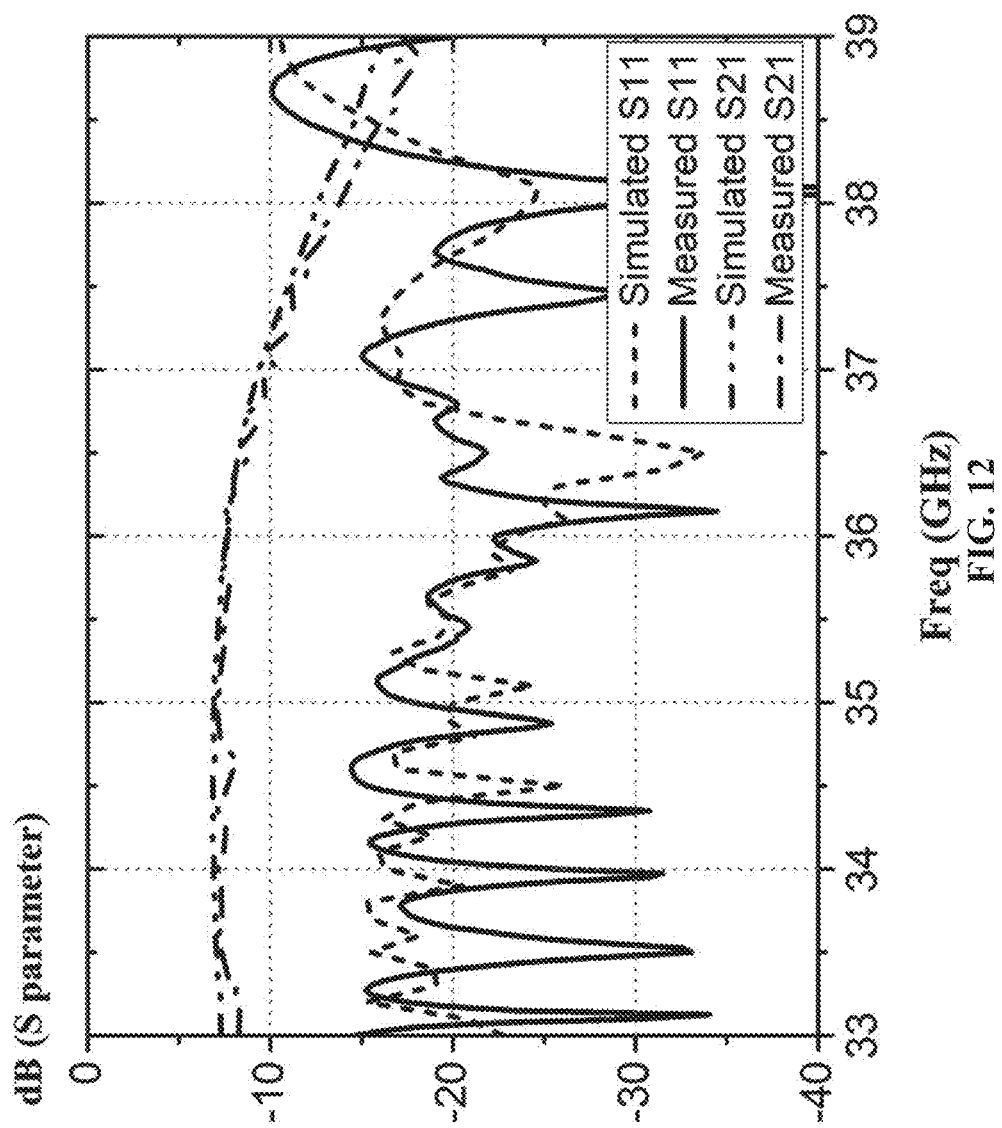
FIG. 12 shows simulated and measured results of S-parameter in Example 1.
Figure 13:
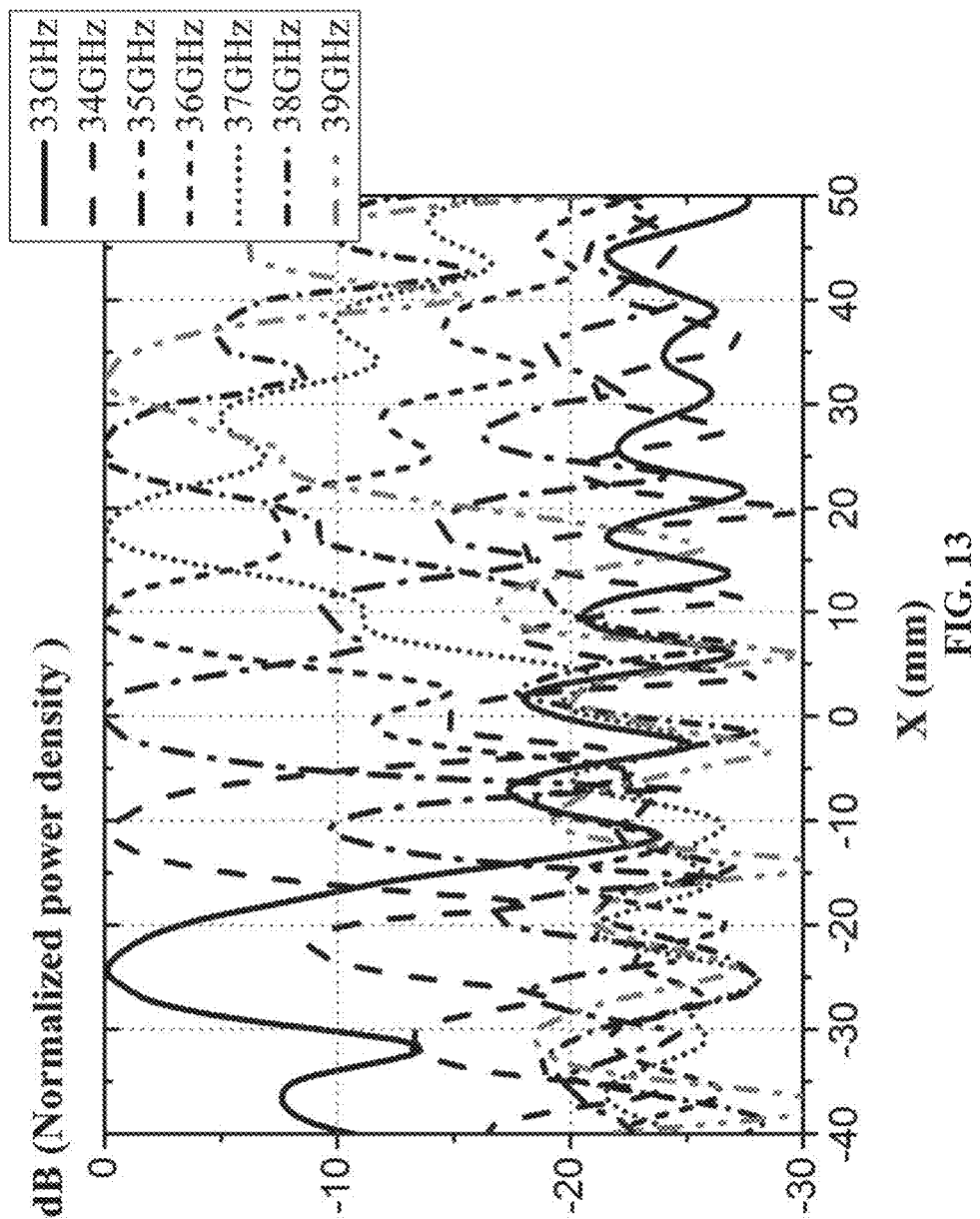
FIG. 13 shows the simulated results of the near-field E-plane normalized power pattern at different frequencies in Example 1.
Figure 14:
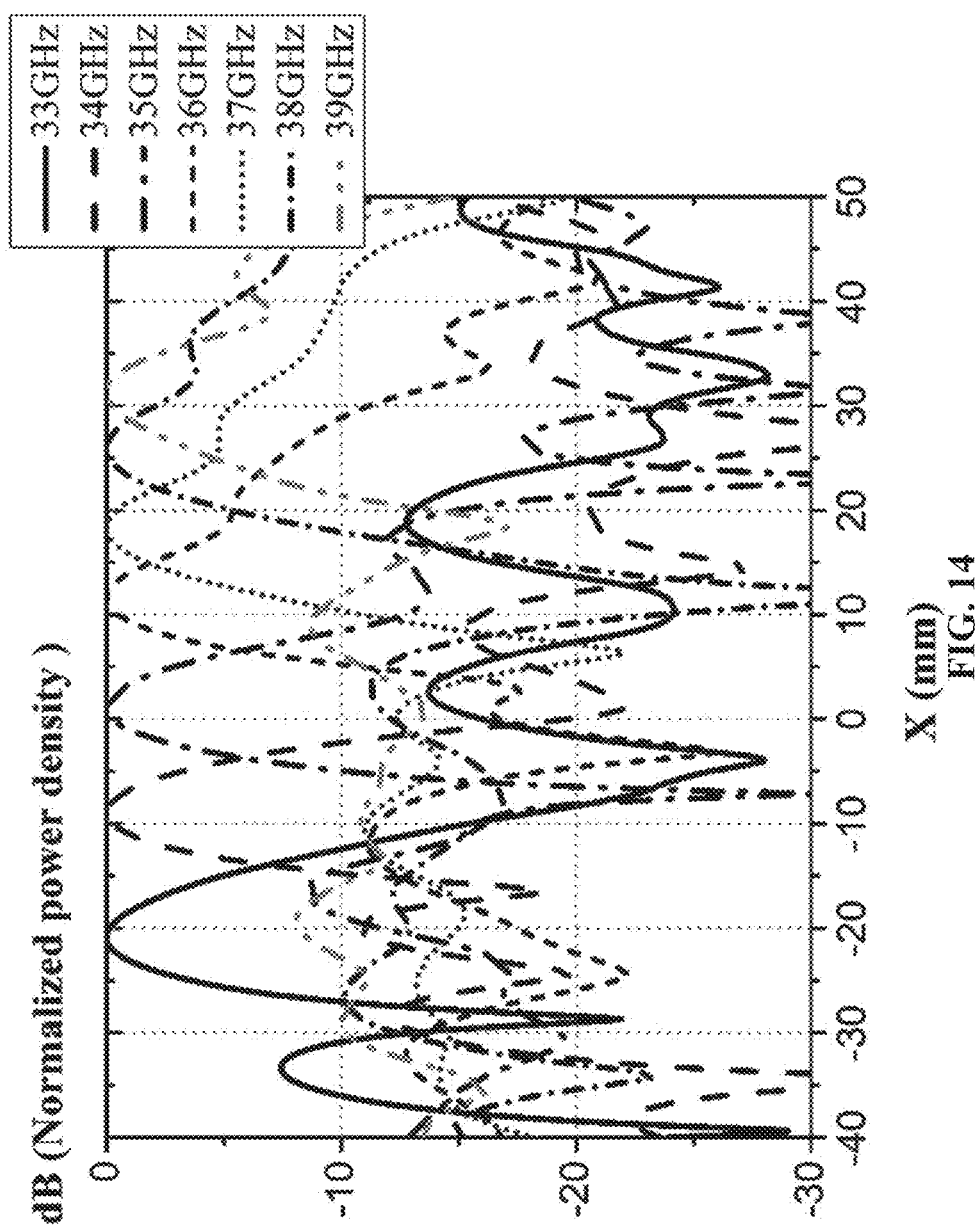
FIG. 14 shows the measured results of the near-field E-plane normalized power pattern at different frequencies in Example 1.

The center operating frequency of this embodiment is 35 GHz. Considering the conformal design, single-layer TLY-5 substrate with a relative permittivity of 2.2 and a thickness of 0.254 mm is selected to design the antenna. Besides, an extended copper is selected as well, and the thickness is 0.0175 mm. First, the slot positions can be obtained by the near-field-focused design method, as shown in FIG. 4. In addition, the slots are designed resonant at the center frequency, so that the width and length of the slot can be determined. The radiating ability of a single slot is mainly related to the offset of the slot. To achieve the near-field focusing characteristic, the radiation distribution on the antenna aperture is required to be balanced. As a result, the offset of the slot can be obtained. The length and width of the 24 slots are 3.2 mm and 0.2 mm. The offset of the 12 slots on the left is 0.2 mm, and the offset of the 12 slots on the right is 0.1 mm. The position of each slot is given in FIG. 4. FIG. 11 shows the simulated near-field focusing and beam-scanning performance, and it can be seen that this embodiment achieves good scanning performance in the range of 33 GHz to 39 GHz. FIG. 12 shows the comparison of measured and simulated S-parameters, it can be found that the measured results agree well with the simulated ones. FIGS. 13 and 14 show the measured and simulated results of the near-field normalized power pattern at E-plane. It can be seen that the antenna has good scanning performance and the measured results agree well with the simulated ones.

Example 2

A curved near-field-focused standing-wave slot array antenna is presented.

The antenna comprises upper and lower copper metal layers 2-1, 2-3, and a dielectric substrate layer 2-2 between the two copper metal layers, and the upper metal copper layer 2-1 is an inner layer near the center of the arc surface. Metallic vias are processed on the dielectric substrate layer 2-2. The described metallic vias comprise two parts, one part is two rows of lateral metallic vias 2-5 symmetrically arranged on both sides of the antenna center line 2-9, and the other part is one column of metallic vias 2-8 located at one end of the curved surface. Two rows of metallic vias 2-5 are used to form substrate integrated waveguide, and one column of metallic vias 2-8 close one end of the two rows of metallic vias 2-5 to form a short circuit. The other end of the two rows of metallic vias 2-5 is provided with a planar feed structure 2-6. Radiating slots, staggered on both sides of the antenna center line 2-9, are etched on the upper metal copper layer 2-1. For the radiating slots 2-4, they have the same length, width, and offset distance from the antenna center line 2-9. The distance between adjacent radiating slots 2-4 is $\frac{1}{2}\lambda_g$. The distance between the short circuit and the slot closest to the short circuit is $\frac{1}{4}\lambda_g$, where $\lambda_g$ is the waveguide wavelength of the electromagnetic wave propagating inside the substrate integrated waveguide.

One end of the dielectric substrate layer 2-2 near the planar feed structure is provided with two metalized matching vias 2-7 for improving the impedance matching between the planar feed structure and the radiating slots. The two metal copper layers and one dielectric substrate layer are fabricated by a planar PCB processing technology, and then proactively conformal to the 3D-printed framework with a desired shape which has the same surface shape with the antenna. FIG. 15 shows the structure of the near-field-focused standing-wave slot array antenna.

FIG. 16 shows the design principle of an antenna for near-field focusing beam-forming. The quadratic phase distribution is as shown in the equation (2-1). $z_0$ represents the height of the near-field focus.

$$r = \sqrt{x^2 + z_0^2} \Rightarrow \frac{r^2}{z_0^2} - \frac{x^2}{z_0^2} = 1 \qquad \text{Equation (2-1)}$$

The propagation characteristic of a transmission line is crucial to the control of amplitude and phase of the electromagnetic field. Before designing the slot array, the curved substrate integrated waveguide transmission line is first introduced. Different curved $r_0$ will have different effects on its propagation characteristics, wherein the propagation constant $\beta$ is determined among the propagation characteristics. FIG. 17 shows the trend of the phase constant $\beta$ at different $r_0$. It can be seen that the influence of $\rho$ is significant when $\rho$ is less than six wavelengths, which cannot be ignored in the phase control and impedance matching. The width, w, of an SIW directly affects its $\beta$ and $Z_0$, which can be used to eliminate the influence of $r_0$. Here, the equation (2-2) can be used to represent the relationship between $\beta$, $Z_0$ and $r_0$, w. The function $f$ can be obtained by the polynomial fitting the equation (2-3), which can be easily calculated with the curve fitting tool of MATLAB. We can establish the relationship of $\beta$ with respect to $r_0$ and w respectively, and $\beta$ which does not change with $r_0$ is obtained.

$$\beta = f(r_0, w) \qquad \text{Equation (2-2)}$$

$$f = p_{00} + p_{10}w + p_{01}r_0 + p_{20}w^2 + p_{11}wr_0 + p_{02}r_0^2 + L \qquad \text{Equation (2-3)}$$

Through the above-mentioned modified method for the propagation characteristics of the curved substrate integrated waveguide, the stable phase change can be ensured, which provides a basis for the curved in the precise amplitude and phase control application of the microwave device.

FIG. 18 shows the overall schematic of the curved near-field-focused standing-wave slot array antenna. In this embodiment, the first matching column 2-21 and the second matching column 2-22 are arranged symmetrically along the center line in the dielectric substrate layer 2-2 to improve the impedance matching between the planar feed structure and the radiating slots. The positions of the two matching columns 2-21, 2-22 and the metalized matching vias 2-7 correspond to each other. The two rows of dielectric substrate through holes 2-10 shown in FIG. 19 are used for fixing the antenna to the framework. The through holes 2-10 are in the same position as the mounting screw holes 2-11 of FIG. 20.

The standing-wave antenna is working at 35 GHz, which are designed on the single-layer TLY-5 substrate with a relative permittivity of 2.2 and a thickness of 0.254 mm. The extended copper is selected, and the thickness is 0.0175 mm. The focal height $z_0$ is 50 mm. The length and width of the 16 slots are 3.557 mm and 0.22 mm, and the offset is 0.096 mm. The arc surface radius $r_0$ is 50 mm. FIG. 21 shows the simulated power density of the proactive conformal standing-wave slot array antenna at the center frequency. It can be seen that a good focus performance is achieved. FIG. 22 shows the comparison of measured and simulated S-parameters, it can be seen that the reflection coefficient of the antenna in the scanning range is good, and the measured results agree well with the simulated ones. FIG. 23 shows the measured and simulated results of the near-field normalized power pattern at E-plane. It can be seen that the antenna has good scanning performance and the measured results agree well with the simulated ones.

It will be obvious to those skilled in the art that changes and modifications may be made, and therefore, the aim in the appended claims is to cover all such changes and modifications.

What is claimed is:

1. A slot array antenna, comprising a smooth curved surface and planar feed structures, the planar feed structures being disposed at two ends of the smooth curved surface and being tangent to the smooth curved surface; wherein:
   the smooth curved surface comprises at least two arcs mutually connected by smooth transition;
   each of the at least two arcs comprises an upper copper metal layer, a lower copper metal layer, and a dielectric substrate layer between the upper and lower copper metal layers;
   the upper copper metal layer comprises radiating slots, and adjacent radiating slots in a linear array have opposite offsets along a center line of the slot array antenna;
   the dielectric substrate layer comprises metallic vias symmetrically arranged on both sides of the central line of the slot array antenna to form a substrate integrated waveguide; and
   an arc distance between an i-th radiating slot and an (i+1)-th radiating slot is represented by $\Delta L_i$, and a curve function of a projection of a surface between the two radiating slots on an xoz plane is represented by $z=f_i(x)$; $\Delta L_i$ and $z=f_i(x)$ should satisfy the equations:

$$\begin{cases} k(r_{i+1} - r_i)\beta\Delta L_i + \pi \\ r_i = \sqrt{(z_0 - f_i(x_i))^2 + x_i^2} \\ \Delta L_i = \int_{x_i}^{x_{i+1}} \sqrt{1 + f_i'(x)}\, dx \\ f_i(x_{i+1}) = f_{i+1}(x_{i+1}) \\ f_i'(x_{i+1}) = f_{i+1}'(x_{i+1}) \end{cases}$$

where:
   $x_i$ and $r_i$ represent transverse coordinates of the i-th radiating slot and a distance between the i-th (i≥1) radiating slot and a near-field focal point, respectively;
   $z=f_i(x)$ is the curve function equation which represents a surface projection between the i-th radiating slot and the (i+1)-th slot in the xoz plane;
   $f_i(x)$ and $f_{i+1}(x)$ intersect at $x_{i+1}$ and derivatives of $f_i(x)$ and $f_{i+1}(x)$ are equal at $x_{i+1}$;
   $\Delta L_i$ is the arc distance between the two radiating slots, which is obtained by integrating a curve equation within a range between $x_i$ and $x_{i+1}$;
   $z_0$ represents the height of a near-field focus;
   $f_i(x_i)$ is an ordinate of the i-th radiating slot; and
   k and β are propagation constants of electromagnetic waves in a free-space and the substrate integrated waveguide, respectively.

2. The slot array antenna of claim 1, wherein the slot array antenna comprises 24 radiating slots, which are the same in width and length.

3. The slot array antenna of claim 1, wherein the upper and lower copper metal layers and the dielectric substrate layer are formed by a planar PCB processing technology, and then proactively conformal to a 3D-printed framework.

4. The slot array antenna of claim 1, wherein the planar feed structures are a T-shaped structure in which a microstrip line transits to the substrate integrated waveguide.

* * * * *